(12) United States Patent
Bowers

(10) Patent No.: US 10,232,402 B2
(45) Date of Patent: Mar. 19, 2019

(54) PISTON DRIVEN ONE SHOT GREASE DISPENSER

(71) Applicant: Robert B Bowers, Woodbridge, NJ (US)

(72) Inventor: Robert B Bowers, Woodbridge, NJ (US)

( * ) Notice: Subject to any disclaimer, the term of this patent is extended or adjusted under 35 U.S.C. 154(b) by 0 days.

(21) Appl. No.: 15/530,990

(22) Filed: Apr. 4, 2017

(65) Prior Publication Data

US 2018/0281014 A1    Oct. 4, 2018

(51) Int. Cl.
*B05C 17/005* (2006.01)
*F16N 11/02* (2006.01)
*F16N 3/10* (2006.01)
*B65D 83/00* (2006.01)

(52) U.S. Cl.
CPC .. *B05C 17/00593* (2013.01); *B05C 17/00516* (2013.01); *B65D 83/0005* (2013.01); *F16N 3/10* (2013.01); *F16N 11/02* (2013.01); *B65D 2221/00* (2013.01)

(58) Field of Classification Search
CPC ........ B05C 17/00516; B05C 17/00593; F16N 11/02; F16N 3/10; B65D 83/0005
See application file for complete search history.

(56) References Cited

U.S. PATENT DOCUMENTS

| | | | |
|---|---|---|---|
| 1,292,572 A | * | 1/1919 | Blanksma ............... F16N 11/02 184/38.1 |
| 1,310,611 A | * | 7/1919 | English .................. F16N 11/02 184/38.1 |
| 1,545,149 A | * | 7/1925 | Ludwick ................ F16N 11/02 137/553 |
| 2,635,787 A | | 4/1953 | Bryant |
| 2,752,920 A | | 7/1956 | Kurkjian |
| 2,956,563 A | | 10/1960 | Sarnoff |
| 3,046,985 A | | 7/1962 | Saenz |
| 3,227,161 A | | 1/1966 | De Lorenzo |
| 3,823,715 A | | 7/1974 | Holanek et al. |
| 4,537,308 A | | 8/1985 | Hollander, Jr. |
| 4,758,158 A | | 7/1988 | Pierce et al. |
| 4,913,263 A | | 4/1990 | Spiers |
| 4,961,661 A | | 10/1990 | Sutton et al. |
| 4,997,107 A | | 3/1991 | Snyder et al. |
| 5,601,530 A | | 2/1997 | Nielsen et al. |
| 5,800,169 A | | 9/1998 | Muhlbauer |
| 6,098,754 A | * | 8/2000 | Toner ..................... F16N 11/10 184/14 |

(Continued)

FOREIGN PATENT DOCUMENTS

| | | | | |
|---|---|---|---|---|
| GB | 15339 | * | 2/1916 | ............. F16N 11/02 |
| GB | 222633 | * | 10/1924 | ............. F16N 11/02 |
| GB | 283419 | * | 1/1928 | ............. F16N 11/02 |

*Primary Examiner* — J C Jacyna

(57) ABSTRACT

The device and method are for one shot greasing of tractor trailer fifth wheels and other structures. The device has an upper tube and a lower tube where the upper tube acts as a piston to push down on the lower tube to dispense a grease supply. The lower tube bottom, or a bottom cap connected thereto, has a plurality of dispensing orifices. Preferred embodiments include a stop mechanism to prevent relative movement of the upper tube and lower tube prior to dispensing, and a removable seal on the bottom that prevents grease release until the seal is removed.

11 Claims, 8 Drawing Sheets

(56) References Cited

U.S. PATENT DOCUMENTS

| | | | |
|---|---|---|---|
| 6,485,281 B1 | 11/2002 | Curl | |
| 6,835,019 B2 | 12/2004 | White | |
| 6,874,599 B1 * | 4/2005 | Riskedal | B62D 53/0885 |
| | | | 184/105.3 |
| 2013/0126558 A1 * | 5/2013 | Schneider | B65D 47/06 |
| | | | 222/330 |

* cited by examiner

PISTON DRIVEN ONE SHOT GREASE DISPENSER

REFERENCE TO RELATED APPLICATIONS

The present application is not related to any pending or issued United States of America or foreign patent or patent application.

BACKGROUND OF INVENTION a. Field of Invention

The present invention generally relates to greasing of "fifth wheels" on tractor trailer rigs, the fifth wheel being the trailer receiver plate with the hinge point (and connect/disconnect point). The present invention is an efficient and useful one shot greasing device and method, that utilizes a telescoping one shot tube of grease that can be administered single handedly. It also has a bottom end of a lower component that is sealed and when the seal is removed, exposes a plurality of dispensing orifices. Ideally, the device may be constructed of biodegradable material, but may be constructed in part or in whole with other materials as well, such as small container metals similar to canned food containers.

b. Description of Related Art

The following patents are representative of the field pertaining to the present invention:

U.S. Pat. No. 6,835,019 B2 to White describes a fluid applicator device that includes a handle member, a dispensing member, an applicator member and a fluid dispensing mechanism. The handle member acts as a container member adapted to receive and store a fluid. The handle member has an opening, and has a closure device openable and closeable at the opening for insertion of at least one of: a fluid; and a fluid-containing cartridge. The handle member dispensing end connected to a dispensing member that is elongated and substantially cylindrical. The dispensing member has a plurality of apertures to create a dispensing manifold. The hollow applicator member is located around the dispensing member, and may preferably fully extend over the end of the dispensing member, as well. The hollow applicator member is an absorbent, deformable, resilient, sponge-like material, and it is rotatably connected to the dispensing member.

U.S. Pat. No. 6,485,281 B2 to Curl relates to repair devices for repairing impact resistant glass such as windshields and vertical glass. The repair device can be used to repair many types of damage to glass including cracks, bulls-eye breaks, star breaks, and angle wing breaks. For repairing breaks, the repair device removes air from the break before the resin is applied to the air-evacuated break. For repairing cracks, the repair device pushes resin into the crack while the device is slid along the crack. The repair device has a piston assembly including a piston, a piston casing, and a piston casing receiver; a mounting bracket; and a suction unit, including a manual vacuum pump. A resin is loaded into the piston assembly and delivered to the break or crack by hydraulic pressure, pneumatic pressure, and/or vacuum mode.

U.S. Pat. No. 5,800,169 to Muhlbauer describes a supply and metering syringe for viscous dental compounds, having a syringe body which contains a piston and opens out in a delivery opening. The delivery opening adjoins the syringe body without a constriction. As a result, a separation of the compound components in the surface region of the emerging strand is prevented. The diameter of the syringe body preferably widens toward the delivery opening.

U.S. Pat. No. 5,601,530 to Nielson et al describes an applicator for inserting a substance into a body cavity. An apparatus for coating paper and a method of forming the paper into an applicator are also disclosed. The applicator is especially useful for inserting a catamenial tampon into a woman's vagina. The applicator includes a tubular member formed from at least one layer of paper and has an interior and an exterior surface. The tubular member is capable of holding the substance which is to be inserted. At least one of the surfaces of the tubular member is coated with a water-insoluble coating which is comprised of from between about 95 to about 98 percent by weight of a polymeric material and from between about 2 to about 5 percent by weight of a slip agent. The coating provides the tubular member with a dry coefficient of kinetic friction ranging from between about 0.35 to about 0.56 and a wet coefficient of kinetic friction ranging from between about 0.78 to about 1.06. This low dry and wet coefficient of kinetic friction values facilitates insertion of the applicator into the body cavity and expulsion of the substance from the applicator.

U.S. Pat. No. 4,997,107 to Snyder et al describes a grease tube defined by a deformable body, including a forward tube nozzle and a key member to effect a winding and pressurizing of the body, with a dispensing nozzle selectively and securably mounted in a threaded inter-relationship to a forward nozzle of the tube body. Modifications of the invention include a matrix of roughened projections, or alternatively a matrix of suction cups integrally cast to the tube body to enhance frictional engagement of the tube during pressurizing thereof.

U.S. Pat. No. 4,961,661 to Sutton et al describe a fluid applicator useful for applying a fluid in a uniform and discrete manner to a remote surface wherein said applicator has a fibrous pad which is saturated and retains the fluid until applied to a surface, a valve or throttle means to control the amount of fluid in the fibrous pad and a telescoping handle element which can be extended to provide an elongate handle for reaching remote areas and to expose a cylindrical fluid vessel having a flexible wall which is compressed to extrude fluid therefrom and into the fibrous pad.

U.S. Pat. No. 4,913,263 to Spiers describes a packaged grease composition for lubrication of fifth wheels on tractor-trailers or similar vehicles. The packet consists of a grease composition sealed in a thin walled plastic envelope. The grease filled envelope is placed on the base plate of the fifth wheel and the envelope readily ruptures under pressure when the plates forming the fifth wheel come together releasing the grease to lubricate the plates. The plastic subsequently disintegrates as these plates rotate on each other leaving no environmental waste to dispose of. The envelope may come in different shapes or the lubricant or envelope may be color coded to indicate the type of lubricant contained within the envelope.

U.S. Pat. No. 4,758,158 to Pierce et al describes a hydrocolloid injection system which utilizes a dispensing syringe as the vial within which the hydrocolloid impression material is shipped and stored prior to usage. The syringe includes a transparent barrel within which the hydrocolloid material is located. A plunger is slideably mounted within the barrel which is to function to cause the hydrocolloid material to flow from the barrel through an outlet opening. The plunger forms an airtight and watertight seal with respect to the barrel with also a cap being located about the outlet opening of the barrel also forming an airtight and watertight seal. The barrel, plunger and cap can all be located within boiling water with no fear of the water itself actually coming into contact with the hydrocolloid impression material. During usage, the cap will be removed and a nozzle assembly mounted in conjunction with the barrel to facilitate depositing of the hydrocolloid impression material at its desired location.

U.S. Pat. No. 4,537,308 to Hollander, Jr describes a package comprising a cylindrical plastic tube closed at each end by an ultrasonic band seal. The seal at one end has a sealed region which is narrower than any portion of the other seal whereby squeezing of the package produces an immediate one-shot dispensing of liquid contained therein by causing rupture of the narrow region of the seal. Various package forms include perpendicularly arranged bands to provide a tetrahedral shape, a tab extending beyond one seal to provide identification of the contents of the package, notched seals providing a tear open package, and a multiple package construction in which one fluid containing tube is contained within another.

U.S. Pat. No. 3,823,715 to Holanek et al describes an introducer for suppositories and flowable, extrudable material. The introducer, which is preferably made of plastic material, has a tubular body with a forward necked-down inserting section and a rear, pressure-generating section in the form of a cylinder within which there reciprocates a pressure-generating piston. The forwarded portion having a smaller effective diameter, such forward section fitting within the necked-down inserting section body. The suppository or other section of the tubular body, and after introduction of the inserting section, such material is forced outwardly by the piston. The introducer of the invention facilitates manipulation with suppository preparations, and greatly improves the hygienic conditions during the introduction of the material.

U.S. Pat. No. 3,227,161 to De Lorenzo describes a syringe for use in introducing medication in the form of a dry powder into a body cavity comprising a barrel, open at its ends, having a plunger reciprocable therein, said plunger being cylindrical, the outer peripheral surface of the barrel being cylindrical for a portion of its length beginning at its discharge end, beginning at a point spaced inwardly from its inlet end, and the outside diameter being gradually and progressively reduced in the direction of its charge end, beginning at a long taper extending longitudinally and radially inwardly in the direction of said discharge end, the tapered portion of the outer peripheral surface comprising a major portion of its length, whereby the syringe is adapted to be more readily introduced into a body cavity, and whereby the barrel is adapted to be more easily having a central bore coextensive with its length, said bore having a cylindrical portion beginning at its inlet end having a diameter corresponding substantially to the diameter of the plunger, and the bore of the barrel being gradually and progressively enlarged in the direction of its discharge end, beginning at a point spaced inwardly from its inlet end, to form a long taper extending longitudinally and radially outwardly in the direction of said discharge end, the tapered portion of its length, whereby the plunger is freely movable in the tapered, gradually enlarged portion of the bore and does not tend to become stuck therein in the presence of fry, powdered material.

U.S. Pat. No. 3,046,985 to Saenz describes a syringe comprising, in combination, an elongated tubular body receiving an ampule, a tubular needle in a the forward end portion of the body for puncturing the ampule for receiving fluid therefrom, means on the rear end portion of the body for ejecting the fluid through the needle, a sleeve connected to and slidable longitudinally on the needle to a forward operative position wherein the needle is concealed and to a rearward inoperative position wherein said needle is exposed, resilient means yieldingly urging the tip forwardly on the needle, and means for releasably anchoring the tip in either position against the tension of said tension resilient means.

U.S. Pat. No. 2,956,563 to Sarnoff describes a hypodermic syringe device comprising a syringe frame having a substantially cylindrical hollow body portion formed with a flexible material vial receiving section having an open side of lesser width than vial receiving section diameter, means providing an end locating and section diameter, means providing an end of a medicament vial in said receiving section, said flexible material body portion with said open side providing for snap insertion and removal of a vial there through and the retention thereof in said receiving section, means including an internal shoulder on the inner side of said vial receiving section spaced longitudinally from said vial end locating means and engageable by the end of a vial opposite to the needle for definitely positioning the vial in said vial receiving section, and means operable axially to a piston in vial whereby such piston may be withdrawn for a blood withdrawal check and pressed through the vial for ejecting fluid from the vial.

U.S. Pat. No. 2,752,920 to Kurkjian describes an injector comprising a casing having a medicament containing chamber provided with an open outer end, said chamber having a seat at its inner end, a plunger chamber head adapted to engage said sat and slidable in said chamber for ejecting medicament from said chamber through said open outer end. A plunger rod carrying said plunger head and slidably mounted in said casing and protruding beyond one end of said casing, said casing and said plunger rod constituting companion members, a threaded abutment element carried by one member, the other companion member being threaded to thereby co-operate with said threaded abutment element abutting the other companion member and pulling said plunger rod and plunger head toward said seat and tightly sealing and locking said head in air tight locked engagement with said seat to seal the inner end of said chamber, and a removable closure carried by the outer end of said casing for sealing the open outer end of said chamber.

U.S. Pat. No. 2,635,787 to Bryant describes a grease cartridge for conventional grease guns comprising a compressible, substantially cylindrical casing, constructed of highly pliable, relatively thin material and adapted to be filled with lubricant material, a pair of substantially flat annular ring structures respectively fixed at the front and rear ends of said casing to peripherally reinforce said casing ends and shaped to form cap receiving sockets around the inner periphery thereof, a pair of removable caps respectively inserted in said sockets and normally retained therein, but being adapted to be removed therefrom to provide openings at both ends of said casing, the annular ring structure at the rear of said casing being adapted to abut the position of a grease gun to uniformly compress the casing as lubricant is discharged from the reinforced forward end of said casing

SUMMARY OF INVENTION

The present invention is directed to methods and devices for piston driven one shot greasing of fifth wheel trailer receivers. Thus, in some preferred embodiments, the present invention piston driven one shot grease dispenser, which comprises: a) a lower tube, being a supply tube, the lower tube having an open top and having a side wall, and having a bottom with a plurality of dispensing orifices; b) a supply of grease in the lower tube for dispensing; c) an upper tube, being a piston, and tightly, movably nested within the top of the lower tube, the upper tube having a closed top and closed bottom; d) a removable stop mechanism located on at least one end of the supply tube and the upper tube to inhibit movement between the lower tube and the upper tube; and, e) a removable seal located on the lower tube bottom to prevent undesired dispensing of the supply of grease; wherein a user may remove the stop mechanism and seal, secure the lower tube and press the upper tube downwardly to dispense the supply of grease from the lower tube.

In some embodiments of the present invention piston driven one shot grease dispenser, the side wall includes finger grips.

In some embodiments of the present invention piston driven one shot grease dispenser, the bottom is a separate component with a bottom side wall being attached to the lower tube side wall.

In some of these embodiments of the present invention piston driven one shot grease dispenser, the bottom side wall includes finger grips.

In some embodiments of the present invention piston driven one shot grease dispenser, the lower tube and upper tube are constructed of a material selected from the group consisting of cardboard, paper, plastic, metal and combinations thereof.

In some embodiments of the present invention piston driven one shot grease dispenser, the orifices are elongated.

In some embodiments of the present invention piston driven one shot grease dispenser, the upper tube and the lower tube have a top view cross section shape selected from the group consisting of circular, oval, square, and rectangular.

In some embodiments of the present invention piston driven one shot grease dispenser, the upper tube is a hollow tube.

In some embodiments of the present invention piston driven one shot grease dispenser, the bottom is a flat bottom and the dispensing orifices have maximum opening cross section of 2 cm.

In some embodiments of the present invention piston driven one shot grease dispenser, the stop mechanism and the removable seal are a single component selected from the group consisting of a plastic wrap, a child resistant plastic wrap, an outside container, and a child resistant outside container.

The present invention, as mentioned, also includes methods of applying grease to a fifth wheel. Thus, the present invention includes a method of greasing a fifth wheel trailer receiver of a vehicle, which comprises: I.) providing a piston driven one shot grease dispenser that includes: a) a lower tube, being a supply tube, the lower tube having an open top and having a side wall, and having a bottom with a plurality of dispensing orifices; b) a supply of grease in the lower tube for dispensing; c) an upper tube, being a piston, and tightly, movably nested within the top of the lower tube, the upper tube having a closed top and closed bottom; d) a removable stop mechanism located on at least one of the supply tube and the upper tube to inhibit movement between the lower tube and the upper tube; and, e) a removable seal located on the lower tube bottom to prevent undesired dispensing of the supply of grease; II.) removing the stop mechanism and the seal; III.) securing the lower tube and applying the lower tube bottom to a fifth wheel; IV.) pressing the upper tube downwardly to dispense the supply of grease to the fifth wheel and moving the dispenser relative to the fifth wheel.

In some embodiments of the present invention method of greasing a fifth wheel trailer receiver, the side wall includes finger grips.

In some embodiments of the present invention method of greasing a fifth wheel trailer receiver, the bottom is a separate component with a side wall and is attached to the lower tube side wall.

In some embodiments of the present invention method of greasing a fifth wheel trailer receiver, the bottom side wall includes finger grips.

In some embodiments of the present invention method of greasing a fifth wheel trailer receiver, the lower tube and upper tube are constructed of a material selected from the group consisting of card board, paper, plastic, metal and combinations thereof.

In some embodiments of the present invention method of greasing a fifth wheel trailer receiver, the orifices are elongated.

In some embodiments of the present invention method of greasing a fifth wheel trailer receiver, the upper tube and the lower tube have a top view cross section shape selected from the group consisting of circular, oval, square, and rectangular.

In some embodiments of the present invention method of greasing a fifth wheel trailer receiver, the upper tube is a hollow tube.

In some embodiments of the present invention method of greasing a fifth wheel trailer receiver, the bottom is a flat bottom and the dispensing orifices have maximum opening cross section 2 cm.

In some embodiments of the present invention method of greasing a fifth wheel trailer receiver, the stop mechanism and the removable seal are a single component selected from the group consisting of a plastic wrap, a child resistant plastic wrap, an outside container, and a child resistant outside container.

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention as claimed.

BRIEF DESCRIPTION OF THE SEVERAL VIEWS OF THE DRAWING(S)

The accompanying drawings, which are included to provide a further understanding of the invention and are incorporated in and constitute a part of this specification, illustrate preferred embodiments of the invention and together with the detailed description serve to explain the principles of the invention. In the drawings.

DETAILED DESCRIPTION OF THE EMBODIMENTS

The present invention piston driven one shot grease dispenser methods and devices have been created to allow a single grease application to fifth wheels when needed in a simple single-handed effort.

Figure 1:
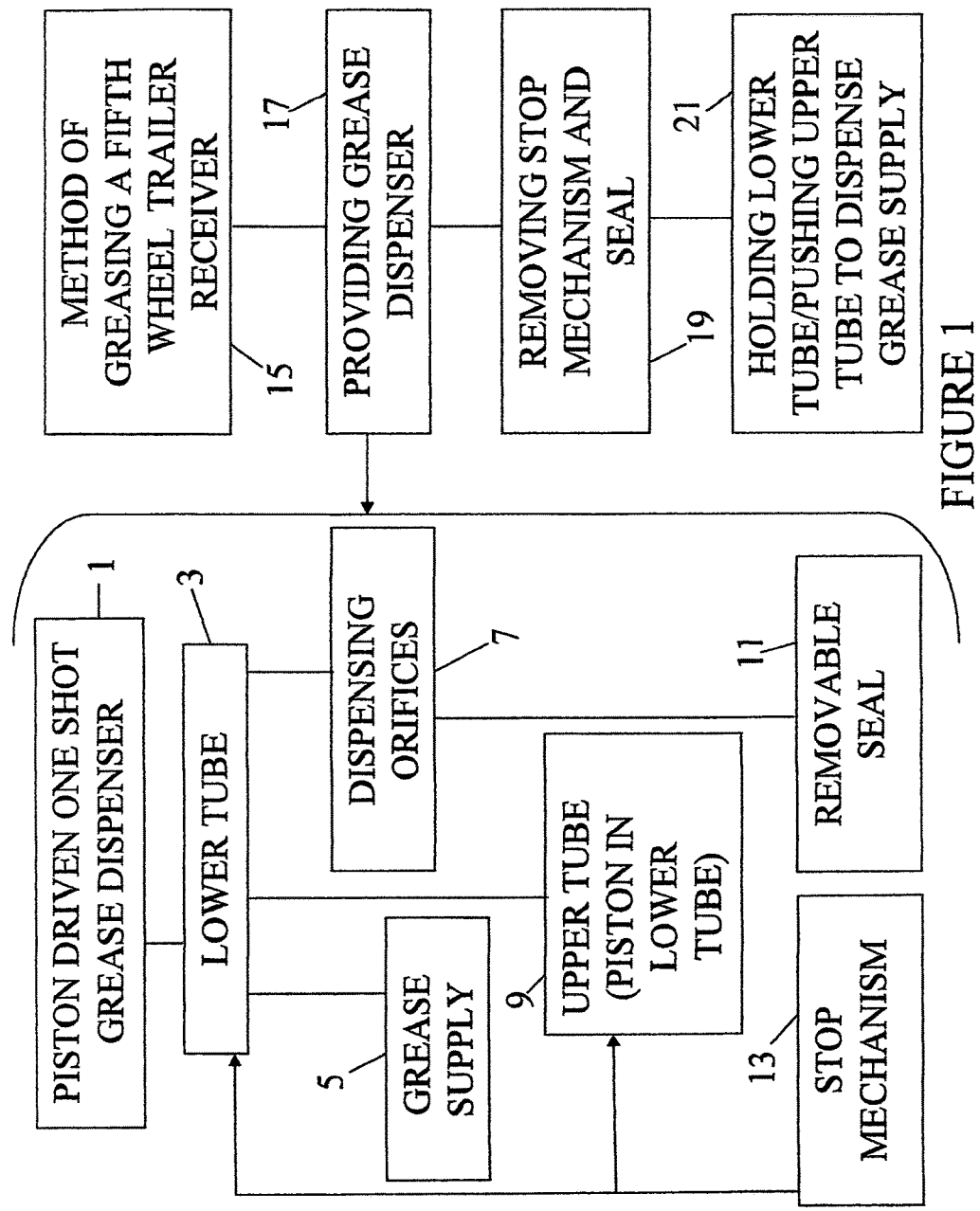
FIG. 1 shows a schematic diagram of the devices and methods of the present invention.

FIG. 1 shows a schematic diagram of the devices and methods of the present invention. Block 1 shows the present invention piston driven one shot grease dispenser with a lower tube, block 3, which contains grease supply, block 5, and has dispensing orifices, block 7, on its bottom with a removable seal, block 11. There is also an upper tube, block 9, which functions as a piston and is positioned in the lower tube. There is a stop mechanism, block 13, that prevents the lower tube and the upper tube to have relative movement until the stop mechanism is removed.

Also in FIG. 1 is the method of greasing a fifth wheel trailer receiver, block 15. The method includes providing a grease dispenser, block 17, that was described above in blocks 1, 3, 5, 7, 9, 11 and 13. The next step is removing the stop mechanism and the removable seal, block 19 and then holding the lower tube while pushing the upper tube toward the lower tube to dispense the grease supply onto the fifth wheel, block 21.

Figure 2:
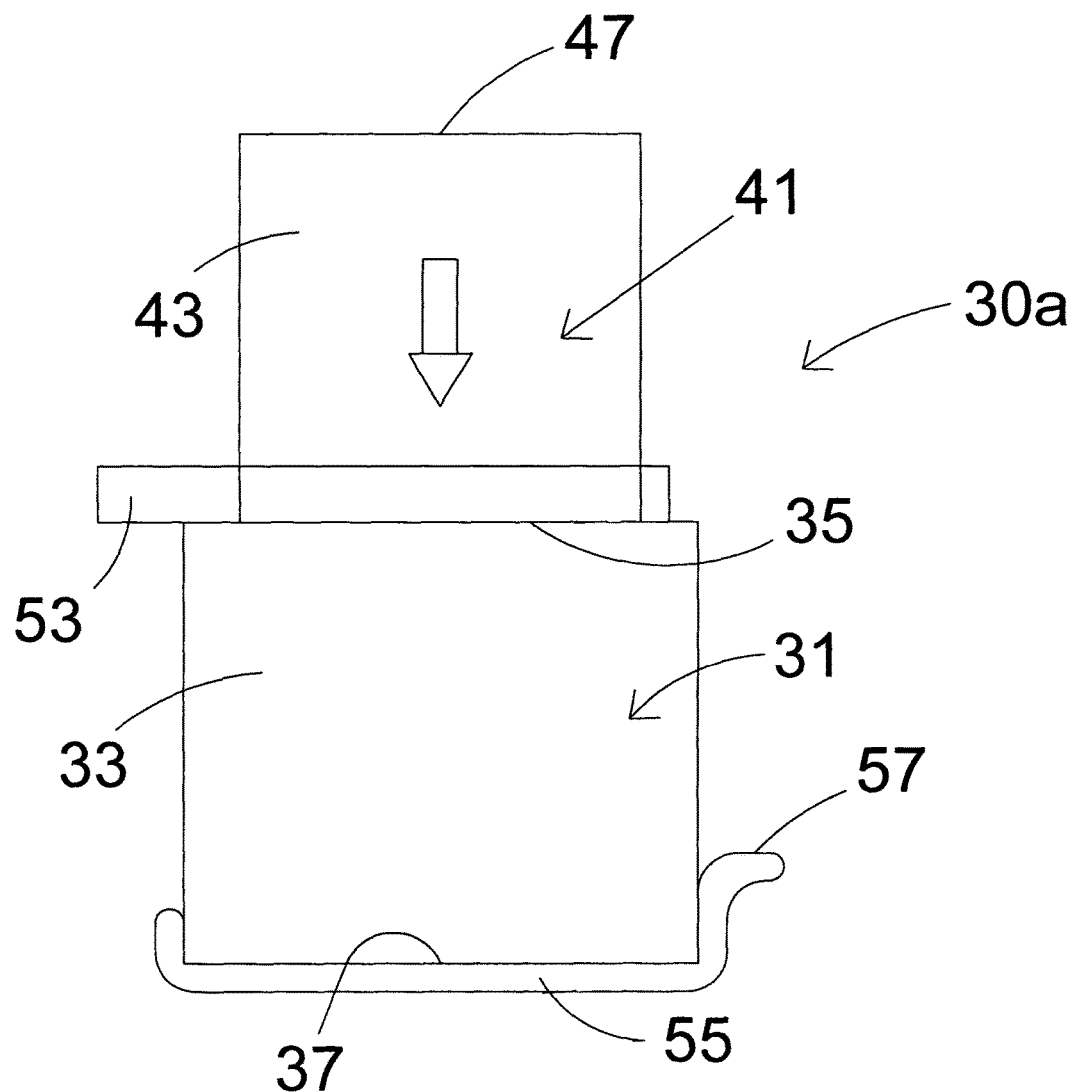
FIG. 2 shows a front view of a preferred embodiment of a present invention piston driven one shot grease dispenser.

FIG. 2 shows a front view of a preferred embodiment of a present invention piston driven one shot grease dispenser 30a. Dispenser 30a includes lower tube 31 that has an open top 35, a side wall 33 and a bottom 37 with dispensing orifices on bottom 37, but concealed by removable seal 55 with pull handle 57. Removable seal 55 may be an adhesive strip or a rigid plastic or metal bottom cap that is adhered to or forced fitted or snapped or screwed onto bottom 37. There is also an upper tube 47 with a solid side wall 43, a solid bottom (not shown) and a solid top 47. This may be hollow or solid throughout but as a practical matter is a hollow tube that acts as a pusher or piston to force the dispensing of the grease supply. The grease supply is contained within lower tube 31 but is concealed in this field. There is also a removable strip 53 which may be adhered to or attached to one or both of upper tube 41 and lower tube 31 to prevent relative movement. When removable strip 53 is removed, then the tubes may have movement relative to one another to dispense the grease.

Figure 3:
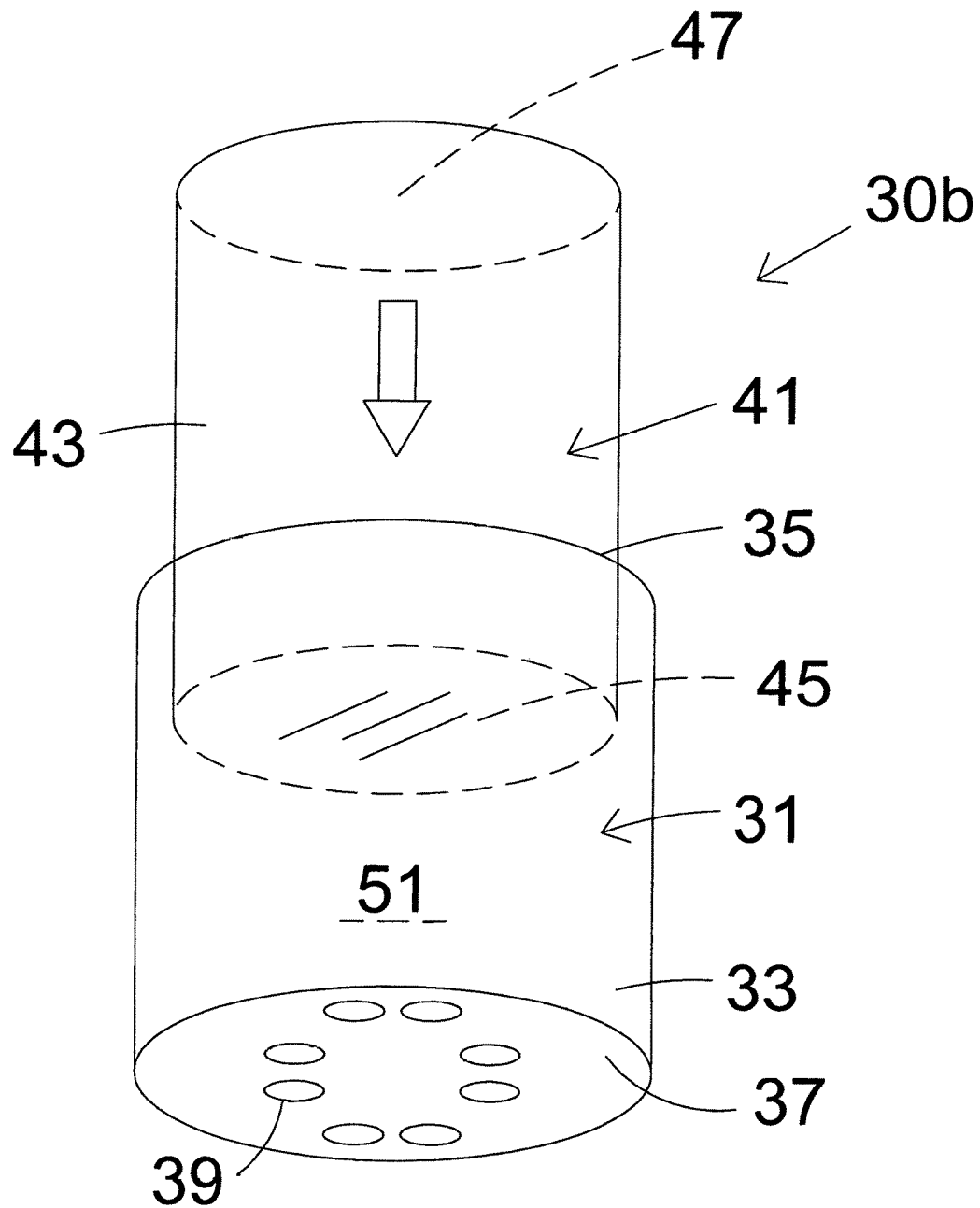
FIG. 3 shows a front oblique view of the present invention piston driven one shot grease dispenser of FIG. 2, but with the pull tab stop removed.

FIG. 3 shows a front oblique view of the present invention piston driven one shot grease dispenser 30b of FIG. 2, previously designated as piston driven one shot grease dispenser 30a that includes the removable strip 53, but here with the removable strip 53 removed. With this is an oblique front view with components that are shown in FIG. 2, identically numbered. Additionally, bottom 37 is now exposed and reveals a plurality of dispensing orifices 39 after removable seal 55 has been removed.

Figure 4:
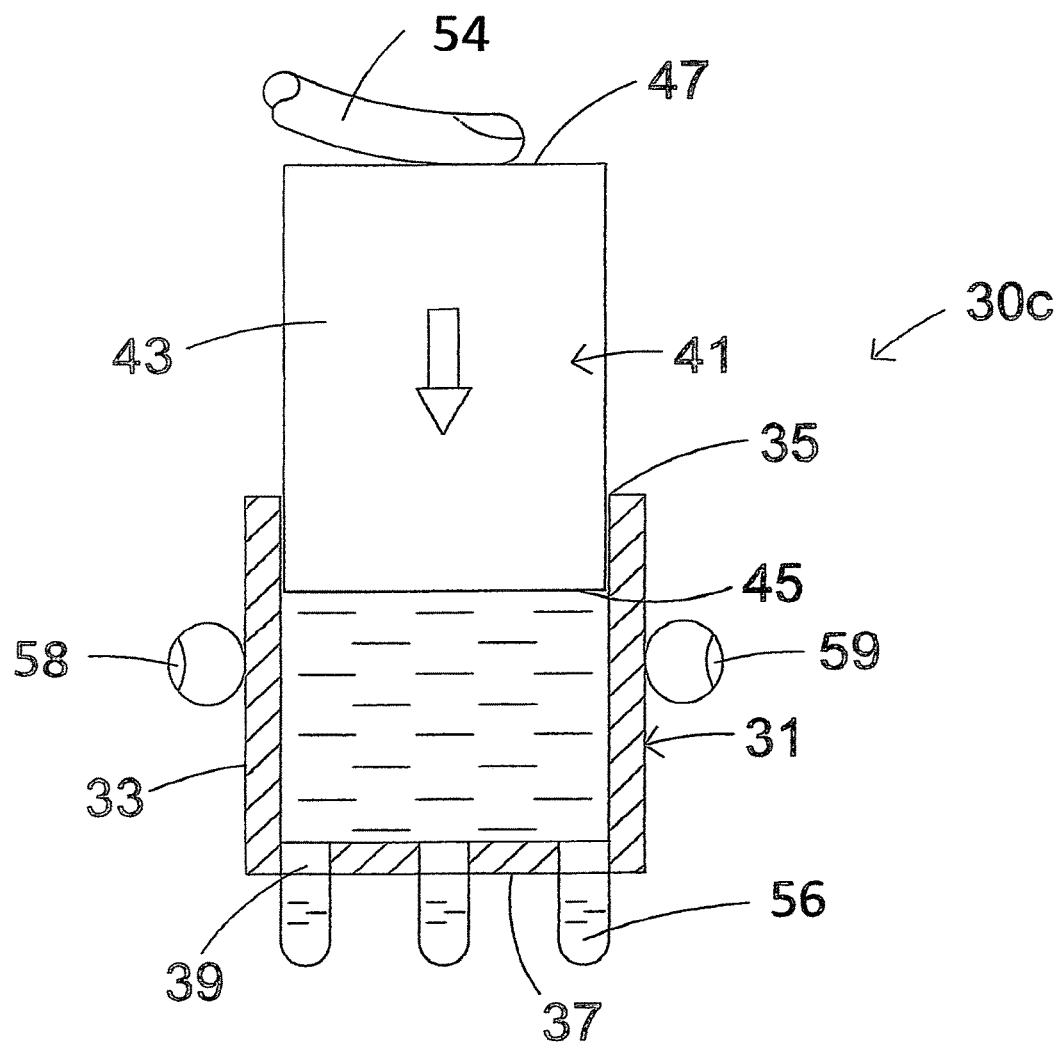
FIG. 4 shows a front cut view of the present invention piston driven one shot grease dispenser of FIG. 3, in a mode where the bottom seal has been removed and the grease is being dispensed.

FIG. 4 shows a front cut view of the present invention piston driven one shot grease dispenser 30c of FIG. 3, previously designated as dispenser 30b, but now in a mode where the bottom seal has been removed and the grease is being dispensed. Identical parts common to those in the preceding Figures are identically numbered. Additionally, fingers 58 and 59 are holding lower tube 31 and in this cut version, grease supply 51 is shown. Thumb 54 pushes down on upper tube 41 while lower tube 31 is being held so as to push grease streams 56 through orifices 39 on bottom 37. Typically this is done against or very close to a portion of a fifth wheel for proper greasing. Although these drawings suggest a cylindrical shape, the components may have a top view foot print shape of any desire, such as round, oval, square, rectangular, polygonal, irregular or otherwise.

Figure 5:
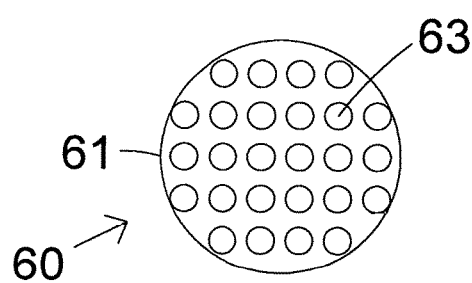
FIGS. 5, 6, 7 and 8 show bottom views of various dispensing arrangements that may be used in the present invention devices and methods.
Figure 6:
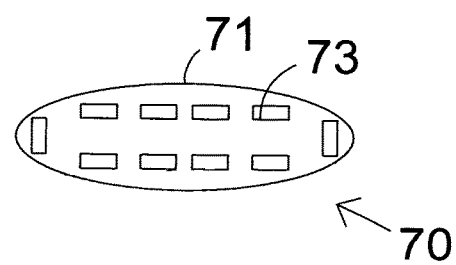
Figure 7:
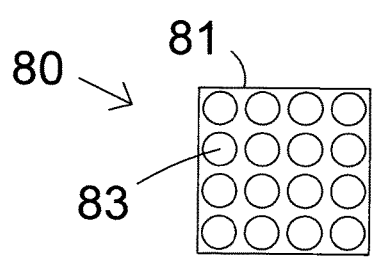
Figure 8:
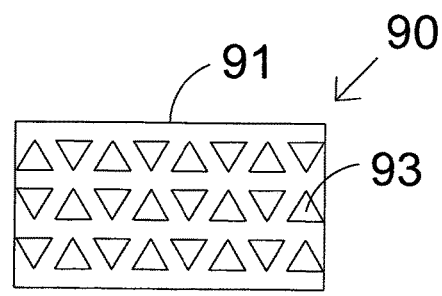

FIGS. 5, 6, 7 and 8 show bottom views of various dispensing arrangements that may be used in the present invention devices and methods. In these figures, bottoms 60, 70, 80 and 90 are illustrated, respectively. Referring to FIG. 5, bottom 60 is circular in shape and has a dispensing plate 61 with a plurality of orifices 63. The orifices 63 are generally round. Referring to FIG. 6, bottom 70 is oval in shape and has a dispensing plate 71 with a plurality of orifices 73. The orifices 73 are generally rectangular. Referring to FIG. 7, bottom 80 is square in shape and has a dispensing plate 81 with a plurality of orifices 83. The orifices 83 are generally oval. Referring to FIG. 8, bottom 90 is rectangular in shape and has a dispensing plate 91 with a plurality of orifices 93. The orifices 93 are generally triangular.

Figure 9:
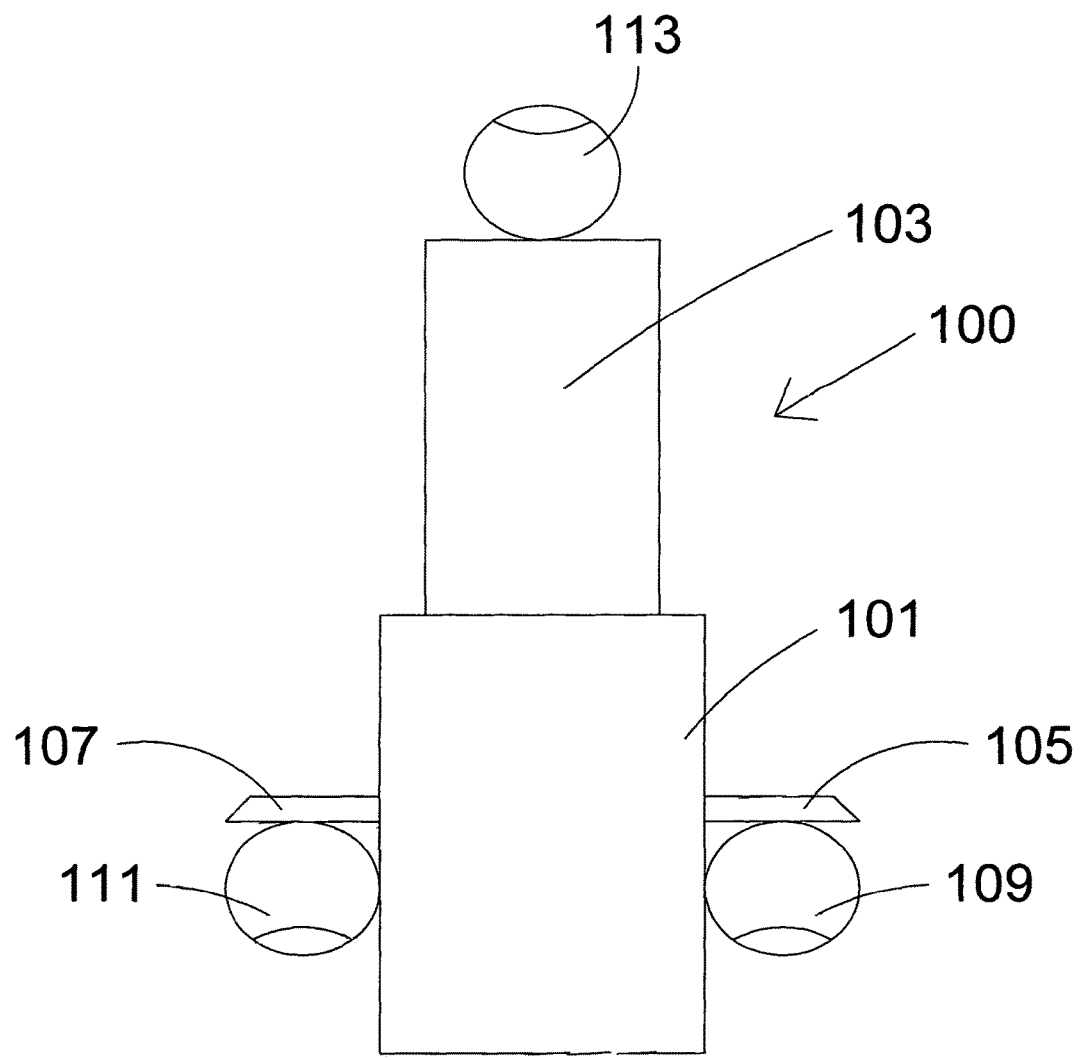
FIG. 9 shows a front view of an alternative preferred embodiment of the present invention piston driven one shot grease dispenser with external finger grips.

FIG. 9 shows a front view of an alternative preferred embodiment of the present invention piston driven one shot grease dispenser 100 with an upper tube 103, a lower tube 101 and with external finger grips 105 and 107. This embodiment has the stop mechanism and the removable seal already removed and it is ready for dispensing. Index finger 109 and middle finger 11 are placed under finger grips 105 and 107, respectively, as shown. Thumb 113 presses down on the top of upper tube 103 which acts as a piston and pushes grease out of the bottom.

Figure 10:
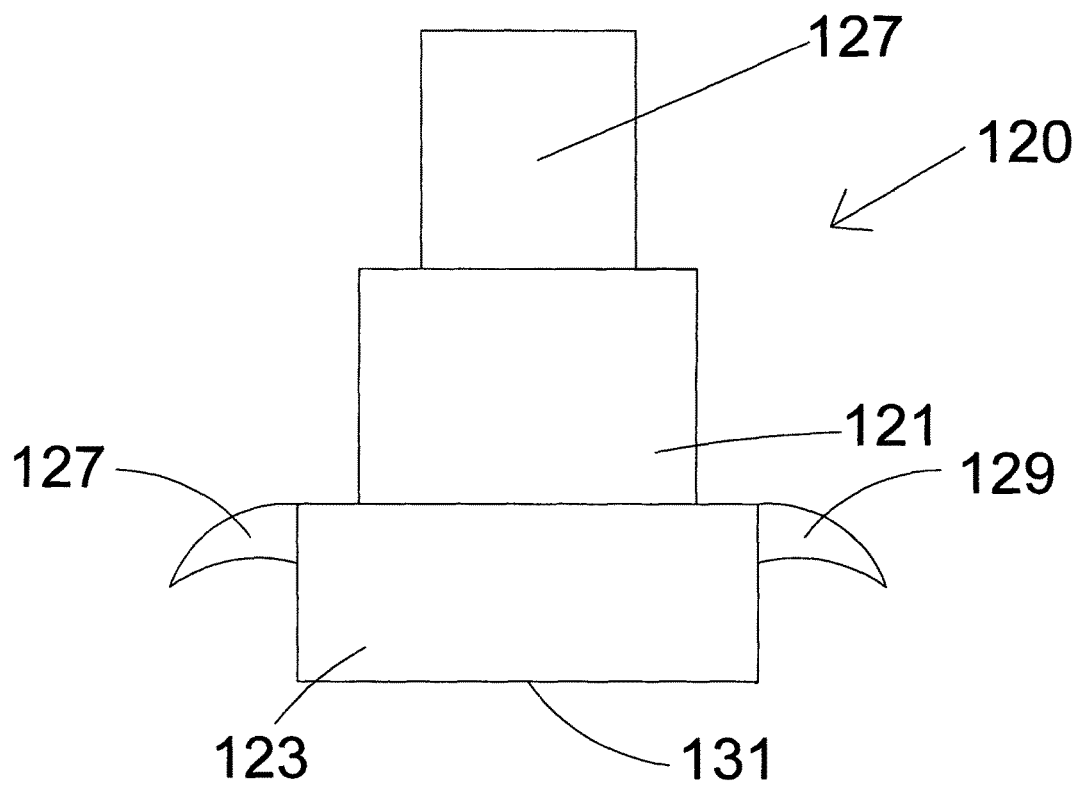
FIG. 10 shows a front view of an alternative preferred embodiment of the present invention piston driven one shot grease dispenser with a separate walled bottom component with optional external finger grips attached thereto; and, FIG. 11 shows an oblique bottom view of another embodiment of a present invention piston driven one shot grease dispenser with a tapered dispensing bottom.

FIG. 10 shows a front view of an alternative preferred embodiment of the present invention piston driven one shot grease dispenser 120. This version has three main components, mainly, upper tube 129, lower tube 121 and bottom cup 123. Bottom cup 123 is glued, screwed, or otherwise attached to lower tube 121 and contains a side wall that not only stabilizes bottom 131, but also supports finger grips 127 and 129. This dispenser 120 is otherwise functional in the same manner as dispenser 100 shown in FIG. 9 and described above. This dispenser 120 has three main components instead of two to its exoskeleton, and it provides additional structural support and ease of filling, as well as the optional external finger grips 127 and 129 attached thereto.

Figure 11:
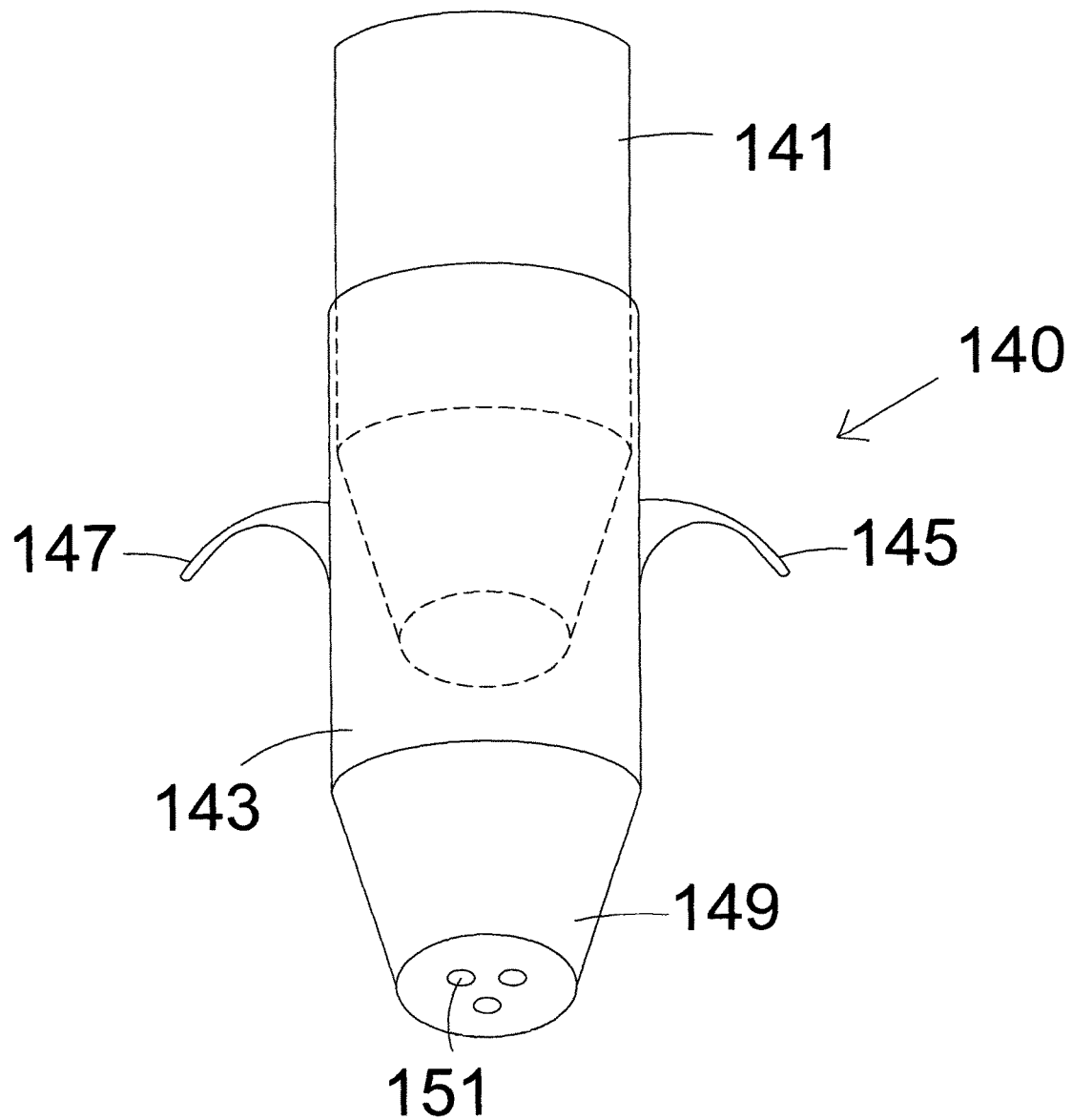

FIG. 11 shows an oblique bottom view of another preferred alternative embodiment present invention piston driven one shot grease dispenser 140. It includes an upper tube 141 and a lower tube 143 with finger grips 145 and 147. Both upper tube 141 and lower tube 143 have tapered (truncated inverted cone) bottoms such as lower tube bottom 149. The seals have been removed to exhibit the dispensing orifices such as dispensing orifice 151. The tapered bottoms will force the grease to the center at the dispensing orifices to provide a more concentrated and controlled release of the grease.

Although particular embodiments of the invention have been described in detail herein with reference to the accompanying drawings, it is to be understood that the invention is not limited to those particular embodiments, and that various changes and modifications may be effected therein by one skilled in the art without departing from the scope or spirit of the invention as defined in the appended claims. For example, the actual shape of the main housing may be any of numerous possibilities as long as its functionality as described is not affected adversely.

What is claimed is:

1. A method of distributing grease on a fifth wheel trailer receiver of a vehicle, which comprises:
   I.) providing a push piston driven one shot grease dispenser that includes:
      a) a lower tube, being a supply tube, said lower tube having an open top and having a lower tube side wall, and having a bottom with a plurality of dispensing orifices, said lower tube side wall having at least one finger grip;
      b) a supply of grease in said lower tube for dispensing;
      c) an upper tube, being a piston, and tightly, movably nested within said top of said lower tube, said upper tube having a closed top and closed bottom;
      d) a removable stop mechanism located on at least one of said supply tube and said upper tube to inhibit movement between said lower tube and said upper tube; and,
      e) a removable seal located on said lower tube bottom to prevent undesired dispensing of said supply of grease;
   II.) removing said stop mechanism and said seal;
   III.) securing said lower tube and applying said lower tube bottom to a fifth wheel;
   IV.) holding said lower tube at said at least one finger grip and pressing said upper tube to push it downwardly, thereby creating downward piston movement in said lower tube to dispense said supply of grease to said fifth wheel and moving said dispenser relative to said fifth wheel.

2. The method of claim 1 wherein said lower tube side wall includes two finger grips.

3. The method of claim 1 wherein said bottom is a separate component with a side wall and is attached to said lower tube side wall.

4. The method of claim 3 wherein said bottom side wall includes finger grips.

5. The method of claim 1 wherein said lower tube and upper tube are constructed of a material selected from the group consisting of card board, paper, plastic, metal and combinations thereof.

6. The method of claim 1 wherein said orifices are elongated.

7. The method of claim 1 wherein said upper tube and said lower tube have a top view cross section shape selected from the group consisting of circular, oval, square, and rectangular.

8. The method of claim 1 wherein said upper tube is a hollow tube.

9. The method of claim 1 wherein said bottom is a flat bottom and said dispensing orifices have maximum opening cross section two cm.

10. The method of claim 1 wherein said stop mechanism and said removable seal are selected from the group consisting of a plastic wrap, a child resistant plastic wrap, an outside container, and a child resistant outside container.

11. The method of claim 1 wherein said removable stop mechanism is a removable strip with a pull handle.

* * * * *